United States Patent [19]
Leutgäb

[11] 4,141,263
[45] Feb. 27, 1979

[54] DEVICE FOR THE CENTERED CLAMPING OF ANNULAR WORKPIECES

[75] Inventor: Hermann Leutgäb, Derching, Fed. Rep. of Germany

[73] Assignee: Goetze AG, Burscheid, Fed. Rep. of Germany

[21] Appl. No.: 817,520

[22] Filed: Jul. 20, 1977

[30] Foreign Application Priority Data

Jul. 24, 1976 [DE] Fed. Rep. of Germany ....... 2633433

[51] Int. Cl.² .............................................. B23B 31/30
[52] U.S. Cl. ...................................... 82/45; 82/40 R; 29/156.63; 279/4
[58] Field of Search ................ 82/45; 408/19; 29/269, 29/156.63; 279/4

[56] References Cited

U.S. PATENT DOCUMENTS

| | | | |
|---|---|---|---|
| 2,377,960 | 6/1945 | Phillips | 29/156.63 |
| 2,651,207 | 9/1953 | Olson | 279/4 |
| 3,132,551 | 5/1964 | Westerlind | 29/156.63 |

Primary Examiner—Leonidas Vlachos
Attorney, Agent, or Firm—Spencer & Kaye

[57] ABSTRACT

A device for the centered clamping, in a turning machine, of an annular workpiece or workpiece stack formed of a plurality of annular workpieces, has a centering cylinder; an arrangement for axially displacing the centering cylinder; first and second axially aligned clamping rings for engaging opposite, radially extending end faces of a workpiece or workpiece stack positioned in a space between the clamping rings; and a clamping arrangement for axially urging the two clamping rings to one another. The clamping arrangement includes a tensioning anchor extending within the work spindle of the turning machine. The device further has a releasable coupling for detachably connecting the tensioning anchor to the work spindle. The first clamping ring is secured to the tensioning anchor and the second clamping ring is fixedly attached to the work spindle.

17 Claims, 1 Drawing Figure

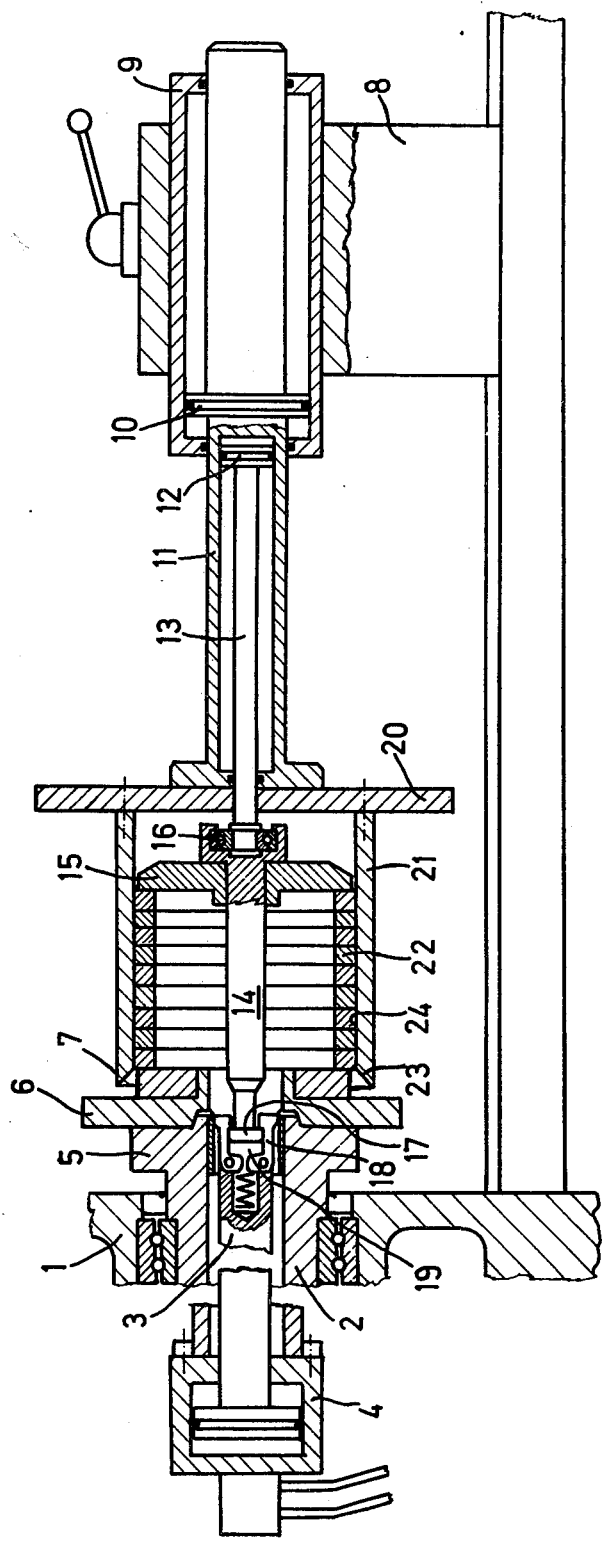

DEVICE FOR THE CENTERED CLAMPING OF ANNULAR WORKPIECES

BACKGROUND OF THE INVENTION

This invention relates to a device for the centered clamping, in a lathe, of annular workpieces, particularly split, radially resilient piston rings. The device is of the type that has an axially displaceable centering cylinder as well as two clamping discs which are adapted to engage the workpiece or the workpiece stack at opposite end faces and axially clamp the same by means of a tensioning anchor extending within the hollow work spindle of the machine tool.

German Pat. No. 1,014,410 discloses a device for the centered clamping of resilient rings, particularly piston rings, on a tensioning mandrel. The device is formed of a mandrel sleeve, an internal pull rod as well as a first clamping disc insertable on the mandrel sleeve and a second clamping disc which may be connected with the pull rod for axially clamping a piston ring stack between the clamping discs. For the centering of the radially resilient piston rings there is provided a centering sleeve which may be inserted over the clamping mandrel and the piston ring stack and which, subsequent to the axial clamping of the piston ring stack, may be removed therefrom.

In practice, the clamping mandrel of the above-outlined known device is connected with the rotary work spindle of a turning machine, such as a lathe. In this arrangement the pull rod extends axially through the conventionally hollow work spindle and is actuated by means of a clamping cylinder disposed at the opposite end of the machine. The centering sleeve is connected indirectly with the machine bed by means of the headstock and is, together with the latter, axially displaceable relative to the machine bed.

The above-outlined device has the disadvantage that for replacing the piston ring stack, not only has one clamping disc to be manually removed from the pull rod terminus, but the piston ring stack first has to be stripped from the mandrel sleeve prior to its removal in the radial direction. The new piston ring stack to be machined has to then be mounted on the clamping mandrel in a reverse order.

There are, to be sure, known machines of a different type in which the piston rings, individually or in a stack, may be radially introduced between two clamping discs and then axially clamped thereby. Such special machines, however, need a bilateral support and guidance of the tensioning (clamping) means which not only is very expensive, but is liable to possible additional malfunctioning, particularly in view of the large axial tensioning force having its path externally and eccentrically of the piston ring stack.

SUMMARY OF THE INVENTION

It is an object of the invention to provide an improved axial clamping device of the type outlined above in which, by utilizing grasping devices or tensioning pliers known by themselves, the annular workpieces may be inserted and automatically clamped individually or as a stack.

This object and others to become apparent as the specification progresses, are accomplished by the invention, according to which, briefly stated, the device for the centered clamping, in a turning machine, of an annular workpiece or workpiece stack formed of a plurality of annular workpieces, has a centering cylinder; an arrangement for axially displacing the centering cylinder; first and second axially aligned clamping rings for engaging opposite, radially extending end faces of a workpiece or workpiece stack positioned in a space between the clamping rings; and a clamping arrangement for axially urging the two clamping rings to one another. The clamping arrangement includes a tensioning anchor extending within the work spindle of the turning machine. The device further has a releasable coupling for detachably connecting the tensioning anchor to the work spindle. The first clamping ring is secured to the tensioning anchor and the second clamping ring is fixedly attached to the work spindle.

By virtue of the additional releasability of the tensioning anchor (extending along the axial length of the piston ring stack) from the pull rod (extending within the work spindle), there is achieved a direct radial accessibility to the ring stack so that the latter, by means of an appropriate grasping device, may be automatically removed and a new stack may be automatically inserted.

Advantageously, the releasable connection between the tensioning anchor and the work spindle or, as the case may be, the pull rod extending within the work spindle, is formed by a jaw coupling known by itself which, subsequent to the axial displacement of the two clutch portions towards one another, automatically engages as a pulling force is applied. The axial length of the tensioning anchor needs to be only slightly longer, if at all, than the length of the piston ring stack to thus limit to a minimum the axial displaceability of the tensioning anchor. For this purpose, in accordance with a further feature of the invention, the jaw clutch is arranged in the work spindle in the zone of the spindle head.

Similarly to the prior art arrangements, a centering cylinder is needed, particularly for the centered tensioning of the radially resilient piston rings. The tensioning anchor, together with one of the clamping discs can be connected with an actuating rod by means of a bearing. The bearing serves only for guiding and supporting the components with respect to one another and is not submitted to the relatively high axial tensioning force.

According to a further advantageous feature of the invention, the tensioning anchor is axially displaceable together with one clamping disc with respect to the centering cylinder which, in a known manner, is axially displaceably supported with respect to the machine bed. With this arrangement it is feasible to first bring into the work position the centering cylinder together with the pull rod and the one clamping disc and then slightly pre-tension the piston ring stack with the clamping disc for holding the stack in the work position while subsequently the centering cylinder is slid over the piston ring stack. Pneumatic or hydraulic piston-and-cylinder units serve for separately actuating the tensioning anchor with the one clamping disc and the centering cylinder.

Although the device according to the invention may essentially find application in any known turning, milling or boring machine — to name only a few — the arrangement according to the invention may find particularly advantageous application in the external machining (plunge-cutting) of piston rings. In such a case then the tensioning anchor extends coaxially within the piston ring stack. It is further of advantage to provide the centering cylinder at its end remote from the work spindle, with two coaxially arranged piston-and-cylinder units wherein the outer cylinder is connected with the machine bed while the piston rod of the inner cylinder carries the tensioning anchor with the clamping disc.

BRIEF DESCRIPTION OF THE DRAWING

The sole FIGURE illustrates a preferred embodiment of the invention in longitudinal section.

DESCRIPTION OF THE PREFERRED EMBODIMENT

In a headstock 1 of a conventional turning machine there is rotatably supported a hollow work spindle 2. Inside the work spindle 2 there extends a pull rod 3 which at its outer end (at its left end as viewed in the FIGURE) is coupled with the work spindle 2 by means of a clamping cylinder unit 4. The other end of the work spindle, constituting the spindle head 5, has a flange 6 to which there is secured a clamping disc 7.

In the tailstock 8 of the turning machine there is clamped a piston-and-cylinder unit which is formed of an external cylinder 9 with its piston 10 and an inner cylinder 11 with its piston 12. The inner cylinder 11 constitutes the piston rod for the piston 10. The piston rod 13 of the piston 12 carries at its end remote from the piston 12, a tensioning anchor 14 as well as a further clamping disc 15 with the intermediary of a bearing 16. The opposite end 17 of the tensioning anchor 14 is so structured that it is engageable by the jaws 18 of a jaw clutch 19 which forms part of the pull rod 3 and which is arranged in the zone of the spindle head 5. To the free end of the cylinder 11 there is affixed a flange 20 to which, in turn, there is secured a centering cylinder or centering sleeve 21. The support carrying the turning tool is not shown for clarity.

In the description which follows the operation of the above-described device will be set forth.

A piston ring stack 22 which is formed of individual, split and, most likely, out-of-round piston rings and which is brought into position by a grasping device (not illustrated) known by itself is, by actuating the piston-and-cylinder unit 11, 12, first urged by means of the clamping disc 15 with a slight axial force against the clamping disc 7. The stack 22 is thus maintained in position, so that the grasping device may be pivoted out of the operational range of the clamping device. Thereafter, the cylinder-and-piston unit 9, 10 operates which, by virtue of its greater effective piston faces, exerts a greater axial force with the same pressure of the hydraulic medium so that, on the one hand, the centering sleeve 21 is pushed over the piston ring stack 22 and, on the other hand, the piston rod 13 is moved back into its cylinder 11 by virtue of the relative motion of the latter. The chamfer 23 of the centering sleeve 21 causes a radial compression of the piston rings to the desired nominal diameter, while the inner surface 24 of the centering sleeve 21 centers the piston rings or the piston ring stack 22, as the case may be. Subsequently, the clamping cylinder unit 4 is actuated which thus moves the pull rod 3 towards the left, as viewed in the FIGURE. As a result of this motion, the jaws 18 of the jaw clutch 19 engage the terminus 17 of the tensioning anchor 14 and clamp with a large force the piston ring stack 22 in the axial direction firmly between the clamping discs 7 and 15. Subsequent to the return motion of the centering sleeve 21 into its initial position (motion towards the right, as viewed in the FIGURE) the machining operation of the external piston ring faces, (such as the provision of grooves), grinding or the like may be effected. During the machining operation the tool is stationary, while the piston ring stack is rotated by the spindle 2.

It will be understood that the above description of the present invention is susceptible to various modifications, changes and adaptations, and the same are intended to be comprehended within the meaning and range of equivalents of the appended claims.

What is claimed is:

1. In a device for the centered clamping, in a turning machine, of an annular workpiece or workpiece stack formed of a plurality of annular workpieces, to hold the same in position for the machining thereof; the turning machine including a hollow work spindle; the device including a centering cylinder; means for axially displacing the centering cylinder; first and second axially aligned clamping discs for engaging opposite, radially extending end faces of a workpiece or workpiece stack positioned in a space between the clamping discs; and a clamping means for axially urging the two clamping discs to one another; the clamping means including a tensioning anchor extending within the work spindle; the improvement comprising releasable means for detachably connecting said tensioning anchor to said work spindle; said first clamping disc being secured to said tensioning anchor and said second clamping disc being fixedly attached to said work spindle.

2. A device as defined in claim 1, wherein said releasable means comprises a jaw clutch.

3. A device as defined in claim 2, further comprising a pull rod extending coaxially within said work spindle and forming part of said work spindle and said clamping means; said tensioning anchor being connected to said pull rod with the intermediary of said jaw clutch.

4. A device as defined in claim 1, wherein the turning machine includes a headstock supporting the work spindle and a tailstock; the improvement further comprising
   a. a first power means supported in the headstock and forming part of said clamping means;
   b. a first rod means forming part of said clamping means and connecting said first power means with said tensioning anchor through said releasable means;
   c. a second power means supported in the tailstock;
   d. a second rod means connecting said second power means with said first clamping disc and said tensioning anchor to axially move said first clamping disc and said tensioning anchor as a unit towards and away from said second clamping disc; and
   e. a third rod means connecting said second power means with said centering cylinder to axially move said centering cylinder relative to said tensioning anchor and said first clamping disc.

5. A device as defined in claim 4, wherein said first power means comprises a fluid pressure operated cylinder-and-piston assembly; said first rod means constituting a piston rod affixed to the piston of said cylinder-and-piston assembly.

6. A device as defined in claim 4, wherein said second power means comprises
   a. a first fluid pressure operated cylinder-and-piston assembly having a first cylinder and a first piston slidably received therein;
   b. a first, hollow piston rod affixed to said first piston and to said centering cylinder; said first, hollow piston rod constituting said third rod means;

c. a second fluid pressure operated cylinder-and-piston assembly having a second cylinder and a second piston slidably received therein; said second cylinder being constituted by said first hollow piston rod; and d. a second piston rod attached to said second piston and to said tensioning anchor, said second piston rod extending within said first piston rod in coaxial relationship therewith; said second piston rod constituting said second rod means.

7. In a device for the centered clamping, in a turning machine, of an annular workpiece or workpiece stack formed of a plurality of annular workpieces, to hold the same in position for the machining thereof; the turning machine including a headstock and a tailstock; the device including a centering cylinder; means for axially displacing the centering cylinder; first and second axially aligned clamping discs for engaging opposite, radially extending end faces of a workpiece of workpiece stack positioned in a space between the clamping discs; and a clamping means for axially urging the two clamping discs to one another; the improvement in said clamping means comprising a. a pull rod supported in said headstock;

b. a tensioning anchor carrying said first clamping disc and being supported in said tailstock in axial alignment with said pull rod;

c. releasable means for detachably interconnecting said pull rod with said tensioning anchor; in the interconnected state of said pull rod and said tensioning anchor said releasable means transmitting axial tensioning forces between said pull rod and said tensioning anchor; in the detached state said tensioning anchor being entirely separable from said pull rod; and d. a power means connected with said tensioning anchor for exerting an axial force thereon.

8. A device as defined in claim 7, wherein said tensioning anchor and said first clamping disc being arranged for displacement as a unit relative to said centering cylinder.

9. A device as defined in claim 8, wherein said power means is coupled to said centering cylinder and said tensioning anchor and comprises means for moving said centering cylinder and said tensioning anchor separately and relative to one another.

10. A device as defined in claim 7, wherein said releasable means comprises a jaw clutch.

11. A device as defined in claim 10, further comprising a hollow work spindle supported in said headstock; said pull rod extending coaxially within said work spindle.

12. A device as defined in claim 11, wherein said work spindle terminates in a spindle head; said jaw clutch being arranged in the zone of said spindle head.

13. A device as defined in claim 11, wherein said tensioning anchor extends in axial alignment with said work spindle and concentrically between said first and second clamping discs.

14. A device as defined in claim 7, wherein said power means comprises a fluid pressure-operated cylinder-and-piston unit.

15. A device as defined in claim 14, wherein said unit is supported in said tailstock and comprises a. a first fluid pressure-operated cylinder-and-piston assembly having a first cylinder and a first piston slidably received therein;

b. a first, hollow piston rod affixed to said first piston and to said centering cylinder for axially moving said centering cylinder relative to said tensioning anchor and said first clamping disc;

c. a second fluid pressure-operated cylinder-and-piston assembly having a second cylinder and a second piston slidably received therein; said second cylinder being constituted by said first hollow piston rod; and d. a second piston rod attached to said second piston and to said tensioning anchor for axially moving said first clamping disc and said tensioning anchor as a unit towards and away from said second clamping disc; said second piston rod extending within said first piston rod in coaxial relationship therewith.

16. A device as defined in claim 7, the improvement further comprising e. an additional power means supported in the headstock and forming part of said clamping means; said pull rod connecting said additional power means with said tensioning anchor through said releasable means;

f. a first rod means connecting said power means with said first clamping disc and said tensioning anchor to axially move said first clamping disc and said tensioning anchor as a unit towards and away from said second clamping disc; and g. a second rod means connecting said power means with said centering cylinder to axially move said centering cylinder relative to said tensioning anchor and said first clamping disc.

17. A device as defined in claim 16, wherein said additional power means comprises a fluid pressure-operated cylinder-and-piston assembly; said pull rod being attached to the piston of said cylinder-and-piston assembly.

* * * * *